(12) United States Patent
Lin

(10) Patent No.: US 8,704,968 B2
(45) Date of Patent: Apr. 22, 2014

(54) LIQUID CRYSTAL DISPLAY

(75) Inventor: Yin-Jen Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 188 days.

(21) Appl. No.: 12/851,563

(22) Filed: Aug. 6, 2010

(65) Prior Publication Data
US 2011/0069248 A1    Mar. 24, 2011

(30) Foreign Application Priority Data

Sep. 18, 2009 (TW) .............................. 98131580 A

(51) Int. Cl.
G02F 1/1335    (2006.01)
G02F 1/1333    (2006.01)

(52) U.S. Cl.
USPC ............................................. 349/58; 349/65

(58) Field of Classification Search
CPC ......... G02F 2001/133317; G02F 2001/133322
USPC .......................................................... 349/58
See application file for complete search history.

(56) References Cited

U.S. PATENT DOCUMENTS

| | | | |
|---|---|---|---|
| 5,694,190 A * | 12/1997 | Matsumoto et al. | 349/151 |
| 5,966,191 A * | 10/1999 | Lee | 349/58 |
| 6,219,116 B1 * | 4/2001 | Yuuki et al. | 349/58 |
| 7,207,707 B2 | 4/2007 | Huang et al. | |
| 7,436,467 B2 * | 10/2008 | Lee | 349/59 |
| 8,031,291 B2 * | 10/2011 | Won et al. | 349/60 |
| 2001/0026336 A1 | 10/2001 | Yano | |
| 2003/0231264 A1 | 12/2003 | Kim | |
| 2003/0234894 A1 * | 12/2003 | Lee | 349/58 |
| 2004/0179151 A1 * | 9/2004 | Lee | 349/58 |
| 2005/0146650 A1 | 7/2005 | Chung, II et al. | |
| 2005/0243573 A1 | 11/2005 | Kim et al. | |
| 2007/0085943 A1 * | 4/2007 | Kang et al. | 349/65 |
| 2007/0268723 A1 | 11/2007 | Weng et al. | |
| 2009/0066874 A1 * | 3/2009 | Tsumura et al. | 349/58 |

FOREIGN PATENT DOCUMENTS

| | | |
|---|---|---|
| JP | 2008-198540 | 8/2008 |
| TW | 575767 | 2/2004 |
| TW | I257511 | 7/2006 |
| TW | I287149 | 9/2007 |
| TW | M331123 | 4/2008 |
| TW | M350935 | 2/2009 |

OTHER PUBLICATIONS

Epson Imaging Devices Corp., Aug. 28, 2008, Machine Translation of JP 2008-198540 A from Patent Abstracts of Japan Website, All Pages.*
"Search Report of European counterpart application", issued on Oct. 26, 2011, pp. 1-6.
"Office Action of Europe Counterpart Application", issued on Nov. 1, 2013, p1-p5.

* cited by examiner

*Primary Examiner* — Dennis Y Kim
(74) *Attorney, Agent, or Firm* — Jianq Chyun IP Office

(57) ABSTRACT

A liquid crystal display (LCD) includes an outer cover, a backlight module, a liquid crystal panel, and a bezel. The backlight module includes a reflection sheet, a light guide plate (LGP), an edge reflector, and a light source. The reflection sheet is disposed on the outer cover and faces the outer cover. There is an interval between the outer cover and the reflection sheet. The LGP is stacked on the reflection sheet and the edge reflector is disposed on the outer cover, wherein a containing space is defined by the outer cover and the edge reflector. The light source is disposed in the containing space. The liquid crystal panel is stacked on the LGP. The bezel is assembled to the outer cover. The outer cover and the bezel enclose the backlight module and the liquid crystal panel and the bezel exposes the liquid crystal panel.

10 Claims, 10 Drawing Sheets

LIQUID CRYSTAL DISPLAY

CROSS-REFERENCE TO RELATED APPLICATION

This application claims the priority benefit of Taiwan application serial no. 98131580, filed on Sep. 18, 2009. The entirety of the above-mentioned patent application is hereby incorporated by reference herein and made a part of specification.

BACKGROUND OF THE INVENTION

1. Field of the Invention

The invention generally relates to a display, and more particularly, to a liquid crystal display (LCD).

2. Description of Related Art

A backlight module used in an LCD of a notebook computer usually has an edge reflector disposed at a side-edge of a light source thereof in addition to having a reflection sheet for reflecting a light beam into a light guide plate (LGP) in the backlight module. For example, Taiwan Patent No. I257511 and Taiwan Patent No. M331123 disclose a backlight module, wherein an L-type reflection sheet is disposed at a side-edge of a light source of the backlight module and serves as an edge reflector, so that a light beam emitted by the light source is reflected into an LGP in the backlight module.

Usually, a plurality of frames are disposed between an outer cover and a bezel of an LCD, and the frames are for fixing the above-mentioned edge reflector and other parts in the LCD. However, too many disposed frames would apparently increase the thickness and the weight of the LCD and also increase the assembling time and the manufacturing cost. To solve the above-mentioned problem, Taiwan Patent No. 575767 provides a design that an outer cover and a bezel in an LCD are further utilized to fix the parts therebetween, so that at least a part of the frames may be saved.

In addition, the LCD usually employs an inner cover disposed between the reflection sheet and the outer cover thereof, where the inner cover extends from a location under the light source to a location over the light source so as to define the above-mentioned edge reflector. Obviously, the above-mentioned inner cover would increase the thickness and the weight of the LCD as well, and the inner cover makes a notebook computer inconvenient for carrying.

SUMMARY OF THE INVENTION

Accordingly, the invention is directed to an LCD with lighter and thinner configuration.

Other advantages of the invention should be further indicated by the disclosures of the invention, and omitted herein for simplicity.

To achieve one of, a part of or all of the above-mentioned advantages, or to achieve other advantages, an embodiment of the invention provides an LCD, the LCD includes an outer cover, a backlight module, a liquid crystal panel, and a bezel. The backlight module includes a reflection sheet, a light guide plate (LGP), an edge reflector, and a light source. The reflection sheet is disposed on the outer cover and faces the outer cover. There is an interval between the outer cover and the reflection sheet. The LGP is stacked on the reflection sheet, and the edge reflector is disposed on the outer cover, wherein a containing space is defined by the outer cover and the edge reflector. The light source is disposed in the containing space. The liquid crystal panel is stacked on the LGP. The bezel is assembled to the outer cover and has a window. The outer cover and the bezel enclose the backlight module and the liquid crystal panel, and the window exposes the liquid crystal panel.

Based on the depiction above, the embodiment or embodiments of the invention may have at least one of the following advantages: there is no inner cover between the reflection sheet and the outer cover, and no inner cover is advantageous to make the LCD lighter and thinner.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
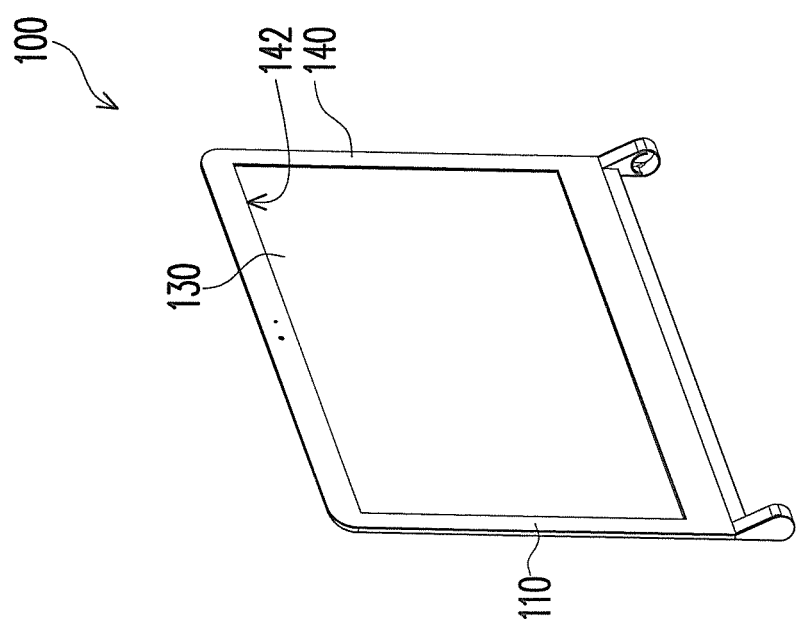
FIG. 1 is a 3-dimensional diagram of an LCD according to an embodiment of the invention.
Figure 2:
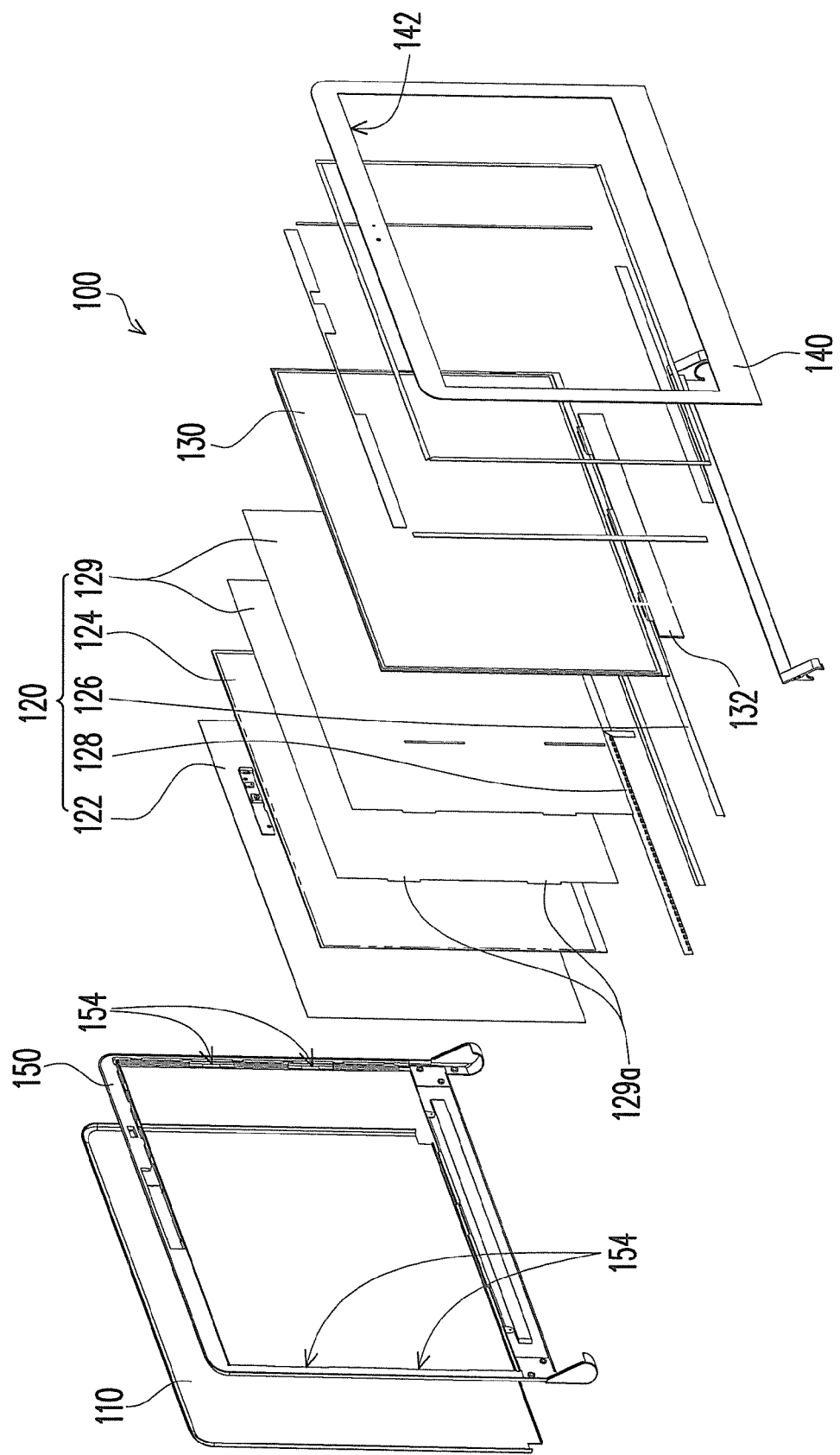
FIG. 2 is an exploded view of the LCD of FIG. 1.
Figure 3:
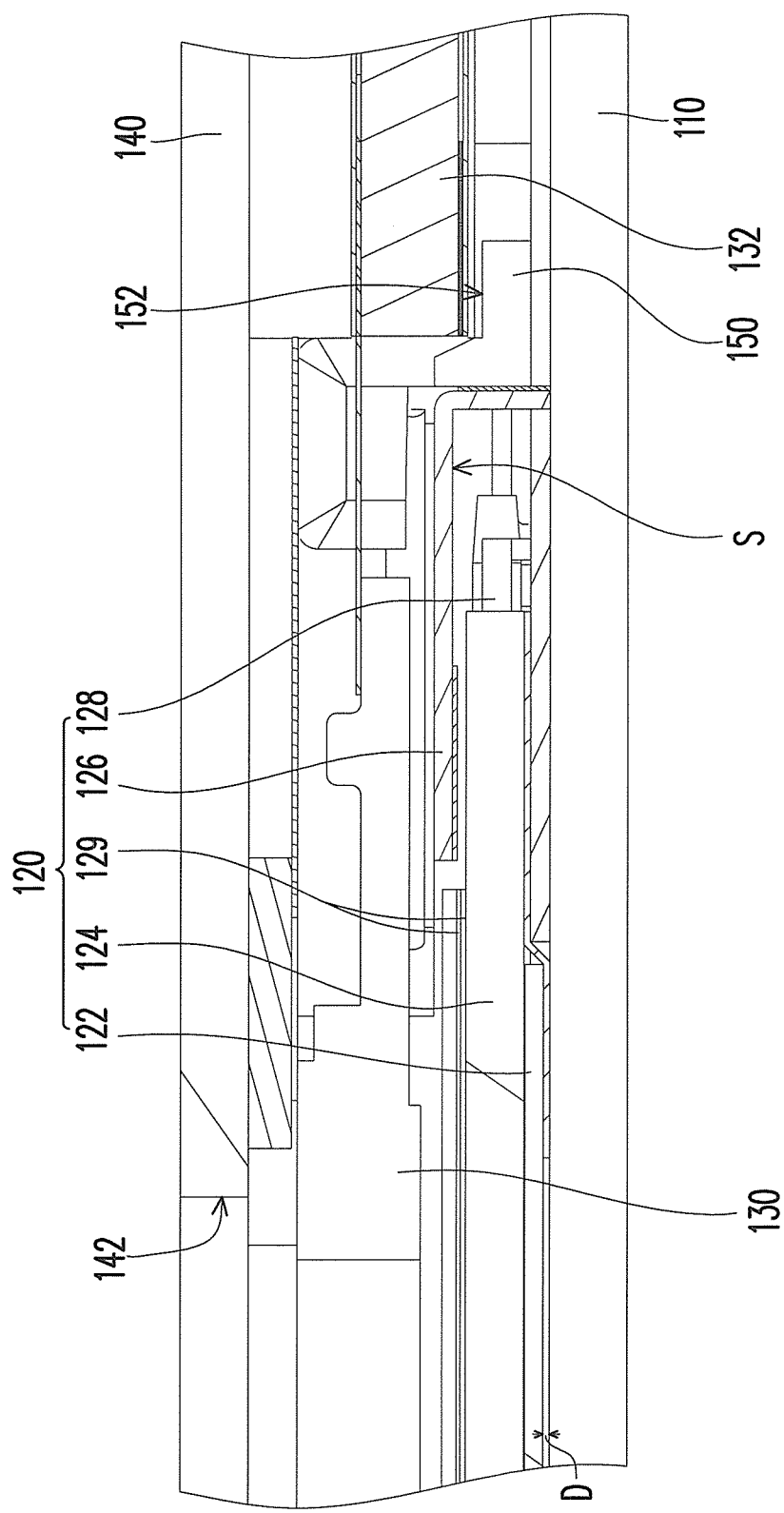
FIG. 3 is a locally cross-sectional diagram of the LCD of FIG. 1.

Referring to FIGS. 1-3, an LCD 100 of the embodiment includes an outer cover 110, a backlight module 120, a liquid crystal panel 130, and a bezel 140, wherein the backlight module 120 includes a reflection sheet 122, an LGP 124, an edge reflector 126, and a light source 128.

The reflection sheet 122 is disposed on the outer cover 110 and faces the outer cover 110, and there is an interval D between the outer cover 110 and the reflection sheet 122 so as to avoid the outer cover 110 squeezing the reflection sheet 122 when the outer cover 110 is deformed by applying an external force on the outer cover 110. The LGP 124 is stacked on the reflection sheet 122, and the edge reflector 126 is disposed on the outer cover 110. A containing space S is defined by the outer cover 110 and the edge reflector 126, and the light source 128 is disposed in the containing space. The liquid crystal panel 130 is stacked on the LGP 124. The bezel 140 is assembled to the outer cover 110 and has a window 142. In more details, the bezel 140 has two regions, wherein the window 142 is a transparent region and the peripheral edge surrounding the window 142 is an opaque region. The outer cover 110 and the bezel 140 enclose the backlight module 120 and the liquid crystal panel 130, while the window 142 exposes the liquid crystal panel 130, so that, viewing from outside of the bezel 140, the bezel 140 looks as a smooth surface with a nice shape.

The reflection sheet 122 and the edge reflector 126 are able to reflect the light beam emitted by the light source 128 into the LGP 124, so that the displaying frame of the liquid crystal panel 130 has sufficient luminance to facilitate viewers watching the displaying frame of the liquid crystal panel 130 through the window 142. It should be noted that under the configuration of the embodiment, there is no inner cover between the reflection sheet 122 and the outer cover 110. As a result, the LCD 100 of the embodiment of the invention is lighter and thinner.

Referring to FIGS. 2 and 3, the LCD 100 of the embodiment further includes a frame 150. The frame 150 is surrounding the backlight module 120 and connected to the outer cover 110 to fix the backlight module 120. The frame 150 has a supporting surface 152 for the liquid crystal panel 130 to be supported on, and there is an interspace between the liquid crystal panel 130 and the backlight module 120 so as to avoid the outer cover 110 squeezing the backlight module 120 and then avoid the backlight module 120 squeezing the liquid crystal panel 130 to damage the liquid crystal panel 130 when the outer cover 110 is deformed by applying an external force on the outer cover 110. In more details, the liquid crystal panel 130 uses a circuit board 132 thereof to be supported on the supporting surface 152 of the frame 150. The frame 150 of the embodiment is, for example, adhesively connected to the outer cover 110, and the bezel 140 is, for example, adhesively connected to the frame 150 so as to make the outer cover 110 and the bezel 140 fixed by each other. Such an adhesively assembling method is advantageous in reducing the number of the required fixtures and saving the assembling time. Besides, the frame 150 has a plurality of positioning grooves 154 and the backlight module 120 further has a plurality of optical films 129 (two ones are shown herein). Each of the optical films 129 has a plurality of locking portions 129a, and the locking portions 129a are respectively locked by one of the positioning grooves 154, so that the optical films 129 are able to be assembled within the frame 150 in right orientation.

In other words, the frame 150 functions to fix the backlight module 120, support the liquid crystal panel 130, and lock the optical films 129, and the frame 150 is able to free the LCD 100 from disposing other frames for supporting the liquid crystal panel 130 or locking the optical films 129.

Figure 4:
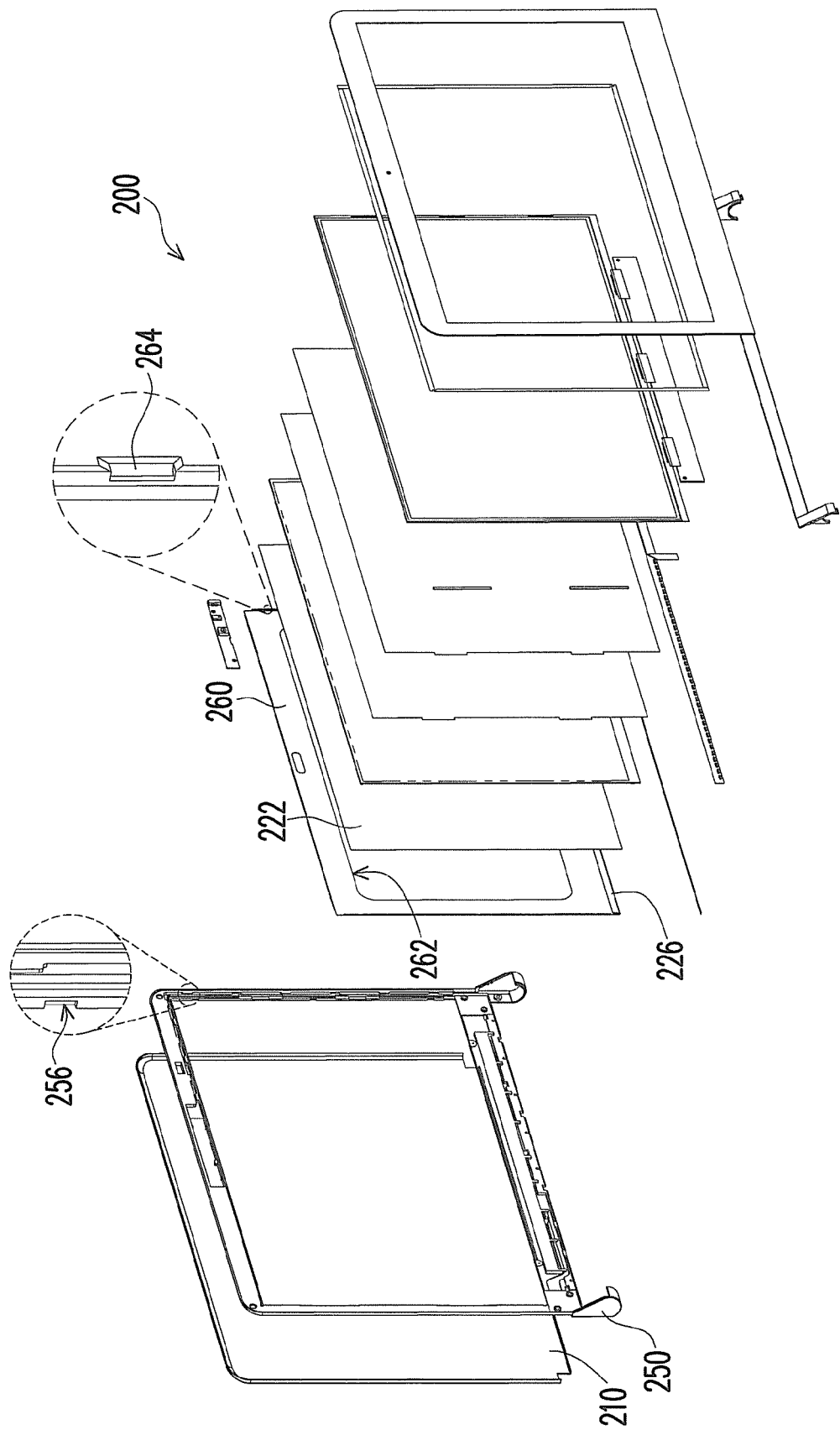
FIG. 4 is an exploded view of an LCD according to another embodiment of the invention.
Figure 5:
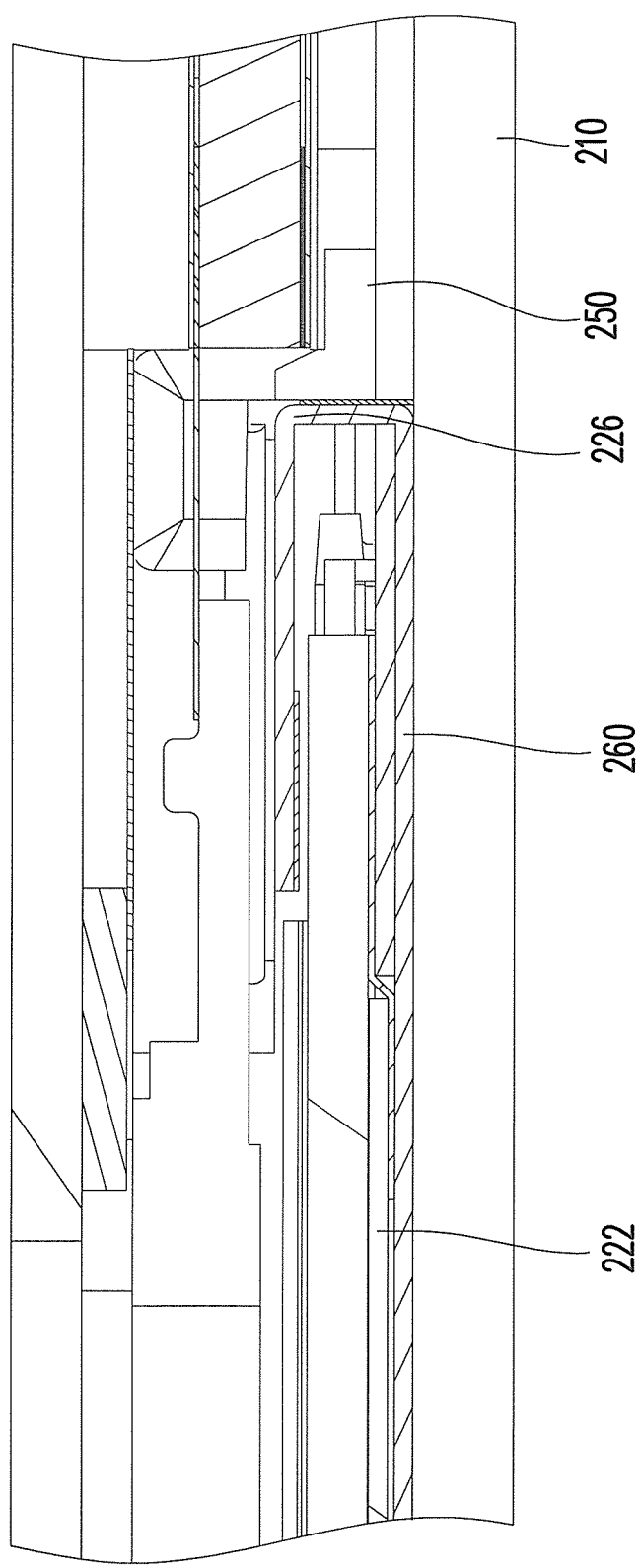
FIG. 5 is a locally cross-sectional diagram of the LCD of FIG. 4.

Referring to FIGS. 4 and 5, in comparison with the LCD 100 of FIGS. 1-3, the LCD 200 of the embodiment further includes an inner cover 260. The inner cover 260 is disposed between the outer cover 210 and the reflection sheet 222, and the edge reflector 226 extends from the inner cover 260. The inner cover 260 has an opening 262, wherein the reflection sheet 222 directly faces the outer cover 210 through the opening 262. Herein, the inner cover 260 having the opening 262 is able to further reduce the weight and the thickness of the LCD 200.

Figure 6:
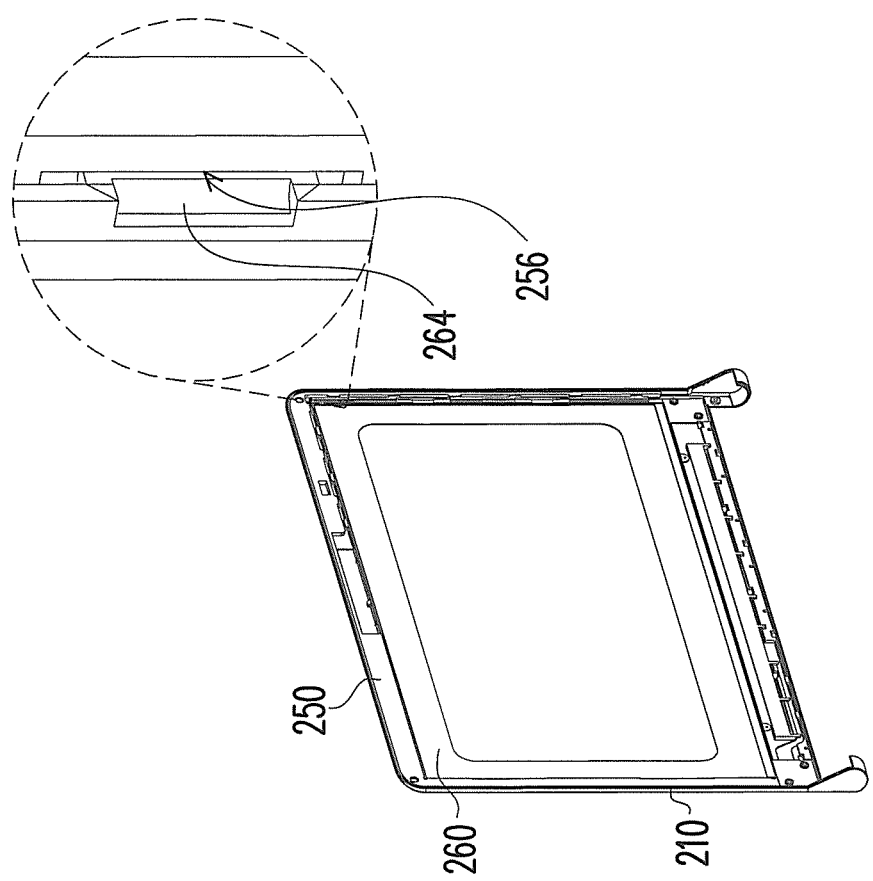
FIG. 6 is a 3-dimensional diagram showing the inner cover of FIG. 4 locked on the frame.
Figure 7:
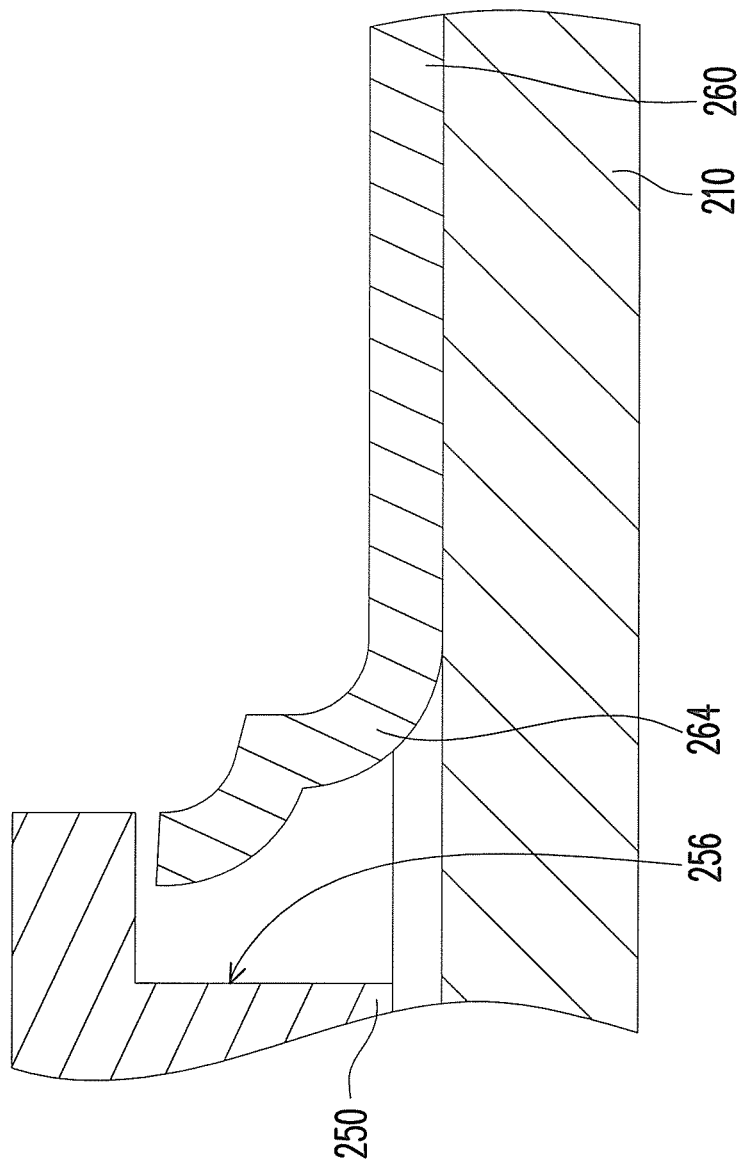
FIG. 7 is a locally cross-sectional diagram showing the inner cover of FIG. 4 locked on the frame.

Referring to FIGS. 4, 6 and 7, the inner cover 260 of the embodiment has a plurality of locking portions 264, and the frame 250 is adhesive to the outer cover 210 and has a plurality of locking slots 256. The locking portions 264 are locked by the locking slots 256 so as to assemble the inner cover 260 to the frame 250.

Figure 8:
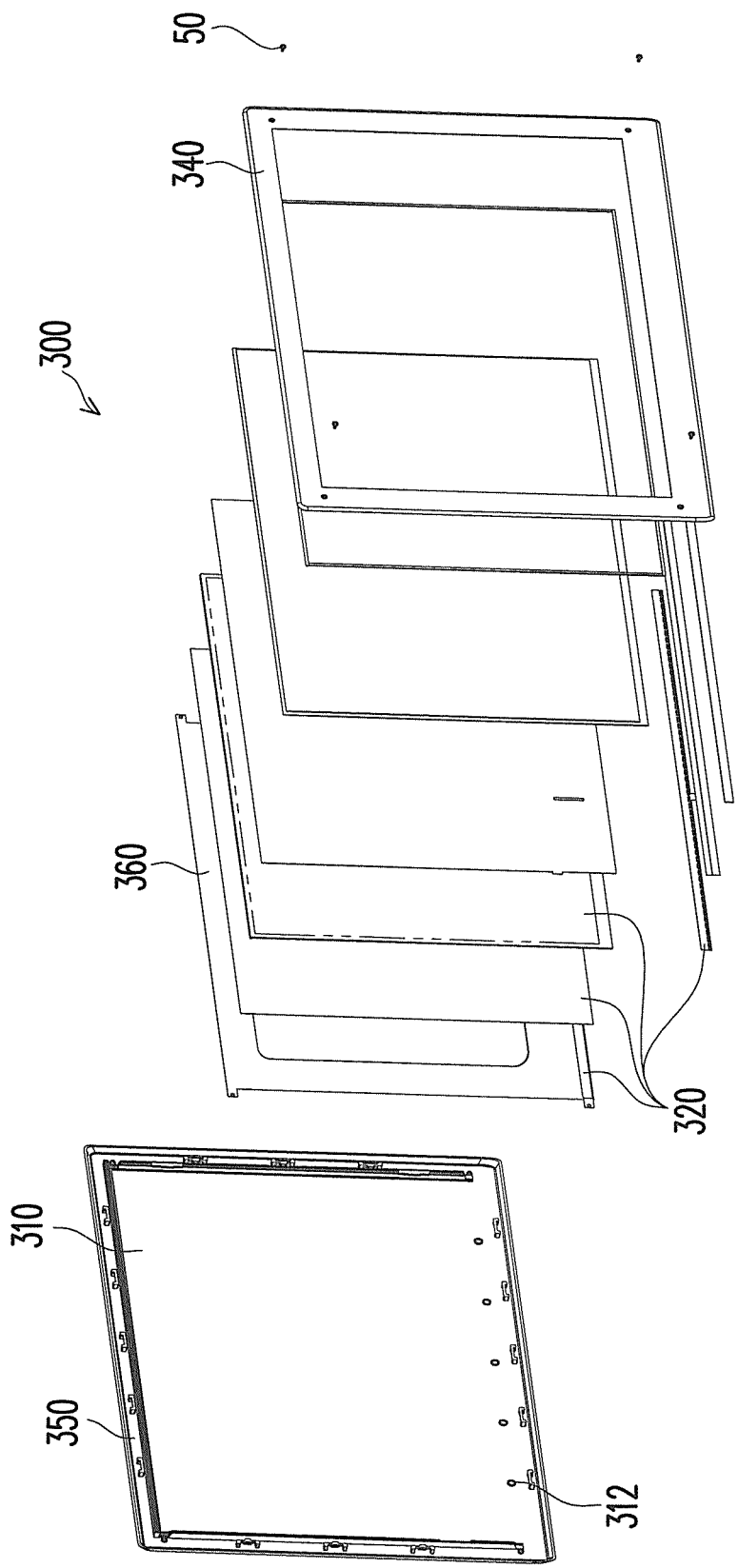
FIG. 8 is an exploded view of an LCD according to yet another embodiment of the invention.
Figure 9:
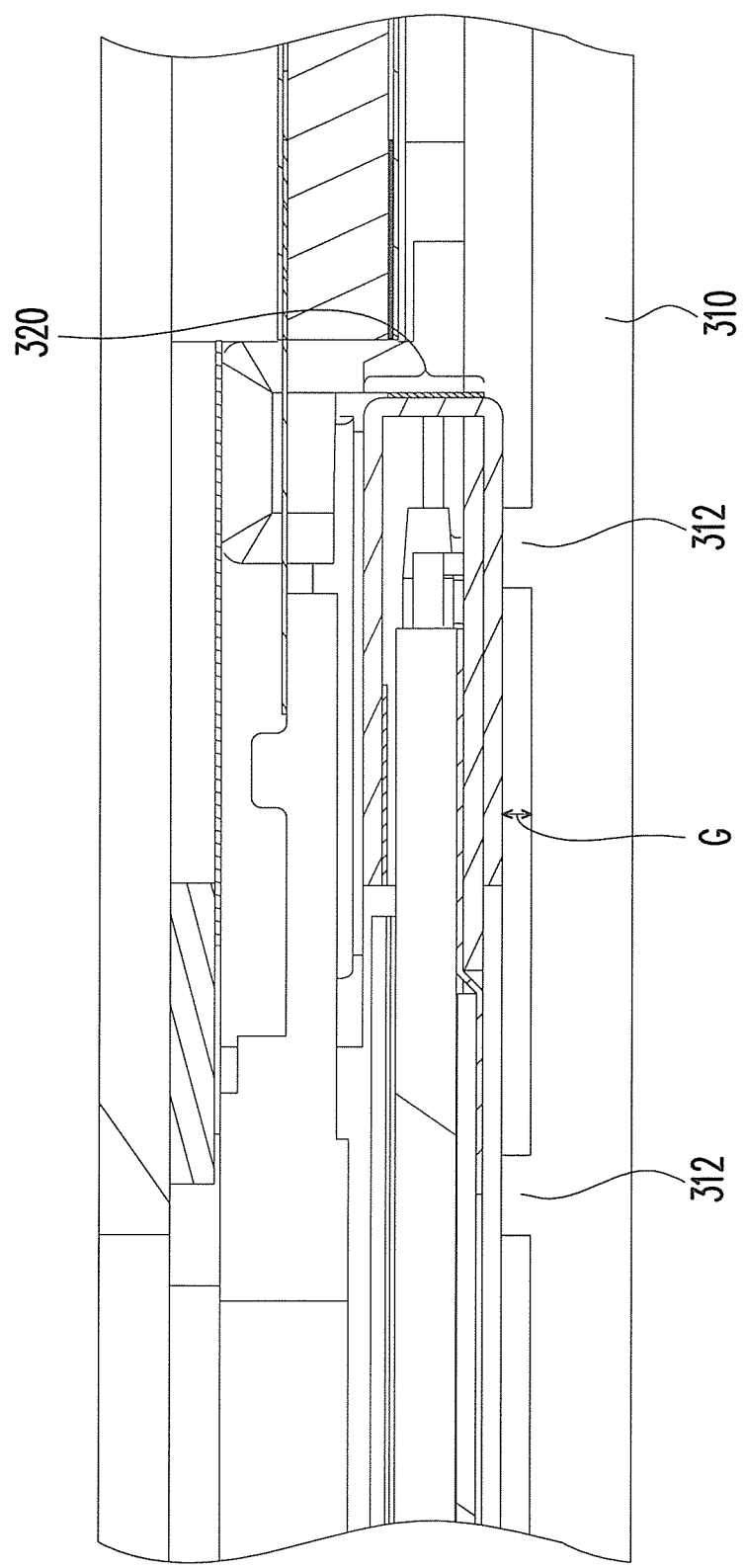
FIG. 9 is a locally cross-sectional diagram of the LCD of FIG. 8.

Referring to FIGS. 8 and 9, in comparison with the LCD 200 of FIGS. 4 and 5, the outer cover 310 of the LCD 300 in the embodiment has a plurality of bumps 312. The bumps 312 support the backlight module 320 and form an interspace G between the backlight module 320 and the outer cover 310, the interspace G may reduce the probability of overheating the outer cover 310 caused by the thermal energy of the backlight module 320.

Figure 10:
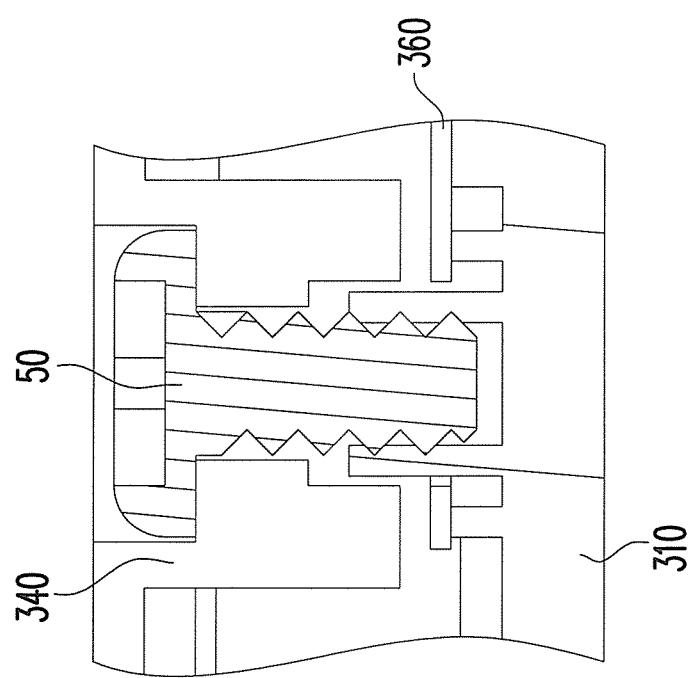
FIG. 10 is another locally cross-sectional diagram of the LCD of FIG. 8.

Referring to FIGS. 8 and 10, in comparison with FIG. 6 where the frame 250 is adhesively connected to the outer cover 210 and the inner cover 260 is locked within the frame 250, in the embodiment, the frame 350 is connected to the outer cover 310 through integrally forming, and a plurality of screws 50 are used to tighten the bezel 340 on the outer cover 310. In this way, the inner cover 360 is fixed between the bezel 340 and the outer cover 310.

In summary, the embodiment or embodiments of the invention may have at least one of the following advantages: there is no inner cover between the reflection sheet and the outer cover, so that the LCD is lighter and thinner. In addition, the frame for fixing the backlight module further functions to support the liquid crystal panel and lock the optical films, and therefore no additional other frames are required to support the liquid crystal panel or lock the optical films, so that the weight and the thickness of the LCD may be further reduced, and the assembling time and the manufacturing cost may be saved. Besides, in the above-mentioned embodiments of the invention, the outer cover, the inner cover, the frame, and the bezel may be made of, for example, metal or plastic. In particular, when at least one of the outer cover, the inner cover, the frame, and the bezel is made of plastic, the weight and the thickness of the LCD may be further reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal display, comprising:
   an outer cover;
   a backlight module, comprising:
      a reflection sheet, disposed on the outer cover and facing the outer cover, wherein there is an interval between the outer cover and the reflection sheet;
      a light guide plate, stacked on the reflection sheet, and having a light-exit surface and a bottom surface opposite to each other;
      an edge reflector, disposed on the outer cover, wherein a containing space is defined by the outer cover and the edge reflector; and
      a light source, disposed in the containing space;
   a liquid crystal panel, stacked on the light guide plate;
   a bezel, assembled to the outer cover and having a window, wherein the outer cover and the bezel enclose the backlight module and the liquid crystal panel, and the window exposes the liquid crystal panel; and
   a frame, surrounding the backlight module, connected to the outer cover, and having a supporting surface, wherein a circuit board of the liquid crystal panel is supported on the supporting surface, and the supporting surface is free from extension into a position between and also by the light source and the liquid crystal panel, and the light source is disposed in the frame and located at the same side of the light guide plate with the supporting surface, orthogonal projections of the frame along a direction normal to the supporting surface are not overlapped with the light source, and orthogonal projections of the circuit board along the direction normal to the supporting surface are not overlapped with the light source, and the direction normal to the supporting surface is normal to the light-exit surface and the bottom surface.

2. The liquid crystal display as claimed in claim 1, wherein the frame has a plurality of positioning grooves, and the backlight module further comprises:
   an optical film, having a plurality of locking portions, wherein the locking portions are respectively locked by the positioning grooves.

3. The liquid crystal display as claimed in claim 1, wherein the frame is adhesively connected to the outer cover.

4. The liquid crystal display as claimed in claim 1, wherein the frame is connected to the outer cover through integrally forming.

5. The liquid crystal display as claimed in claim 1, wherein the bezel is adhesively connected to the frame.

6. The liquid crystal display as claimed in claim 1, further comprising:
   an inner cover, disposed between the outer cover and the reflection sheet and having the edge reflector and an opening, wherein the reflection sheet directly faces the outer cover through the opening.

7. The liquid crystal display as claimed in claim 6, wherein the inner cover is locked on the frame.

8. The liquid crystal display as claimed in claim 6, wherein the inner cover is screwedly fixed on the outer cover.

9. The liquid crystal display as claimed in claim 1, wherein the outer cover has a plurality of bumps, and the bumps support the backlight module and form an interspace between the backlight module and the outer cover.

10. The liquid crystal display as claimed in claim 1, wherein the supporting surface is not higher than the light-exit surface and is not lower than the bottom surface.

* * * * *